Nov. 28, 1944.    J. DUGAN    2,363,948
GUNFIRE CONTROL SYSTEM
Filed Jan. 19, 1942    4 Sheets-Sheet 4
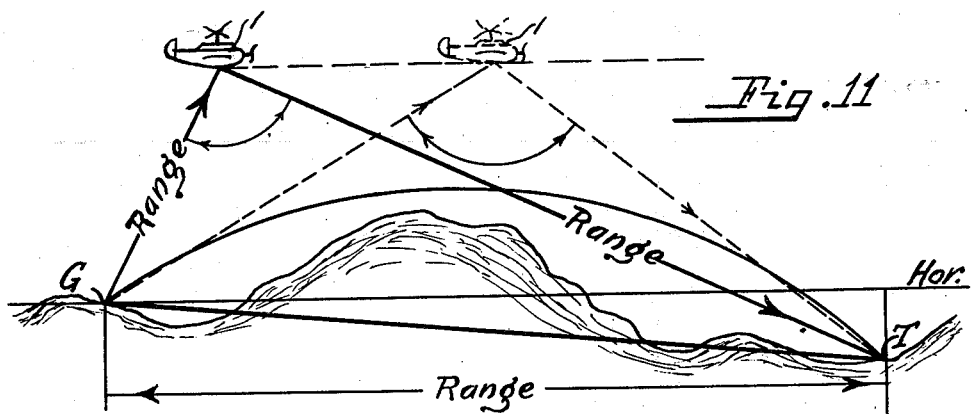
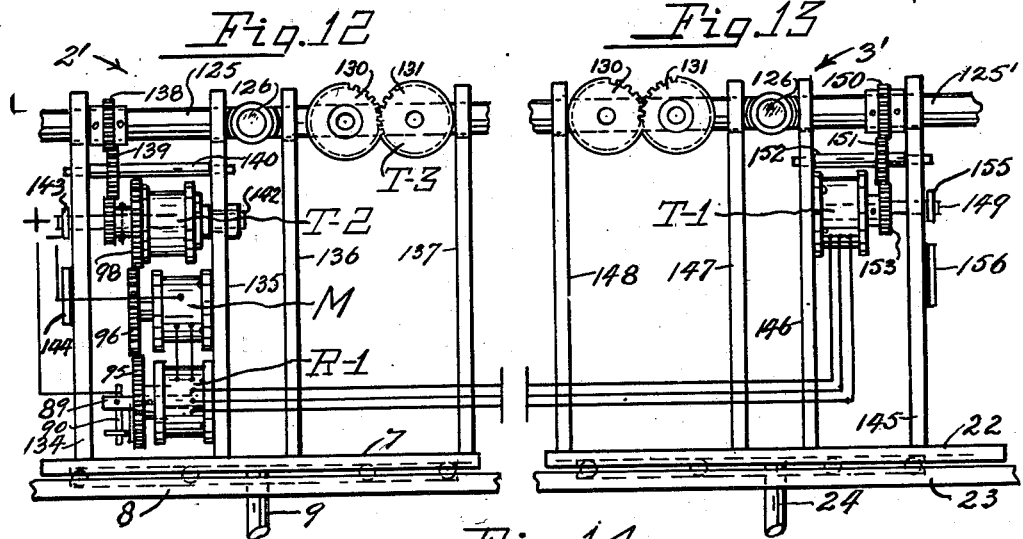
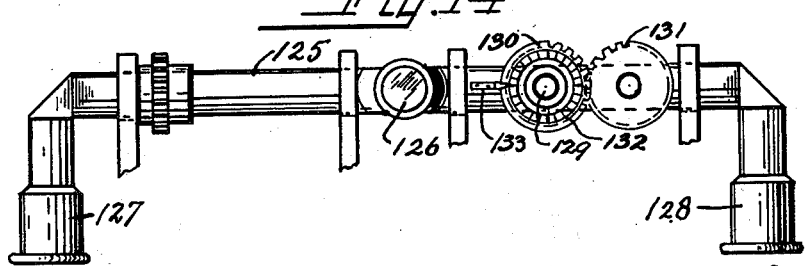
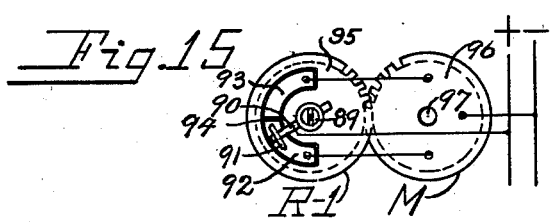
Inventor
Joseph Dugan Patented Nov. 28, 1944

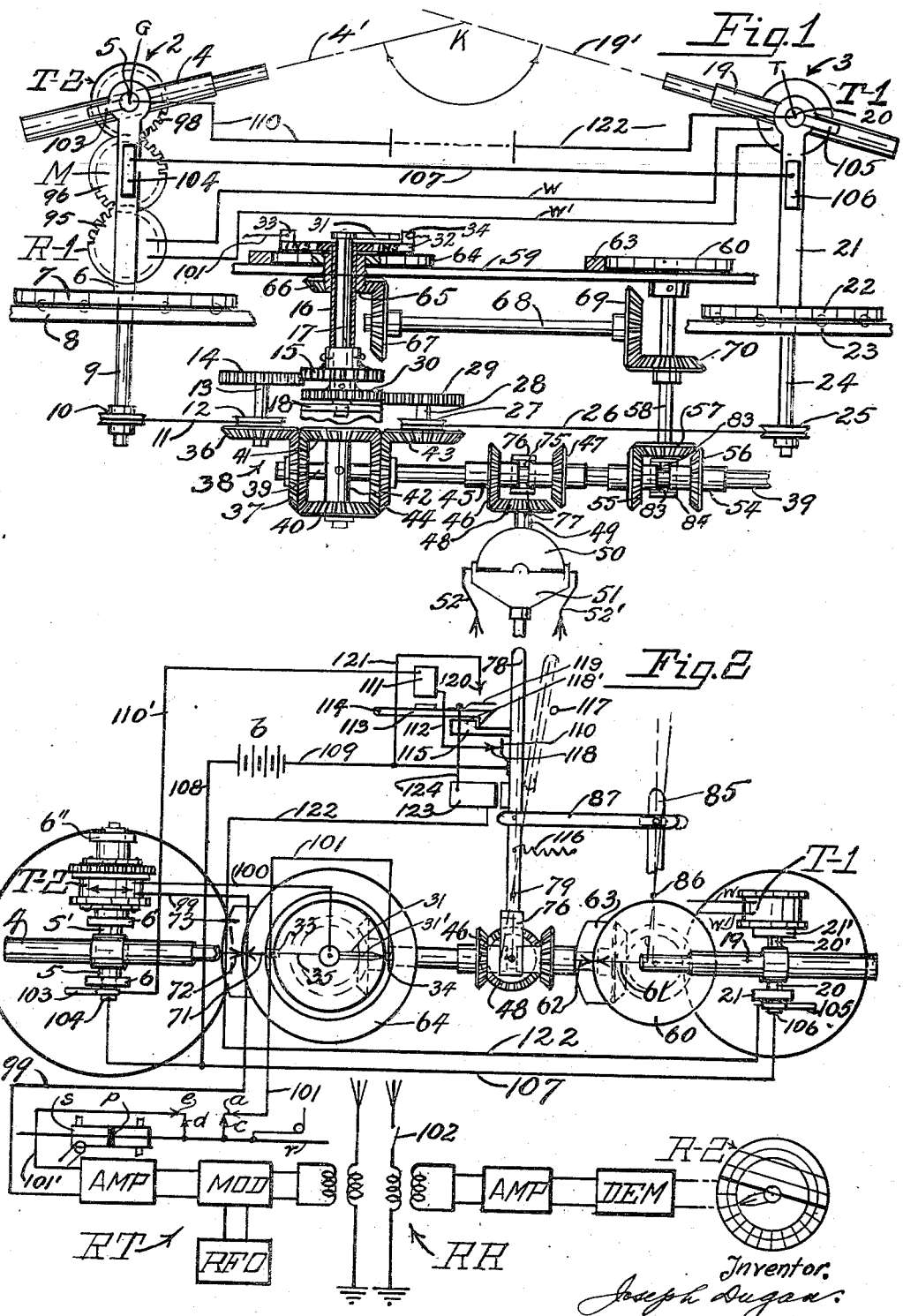

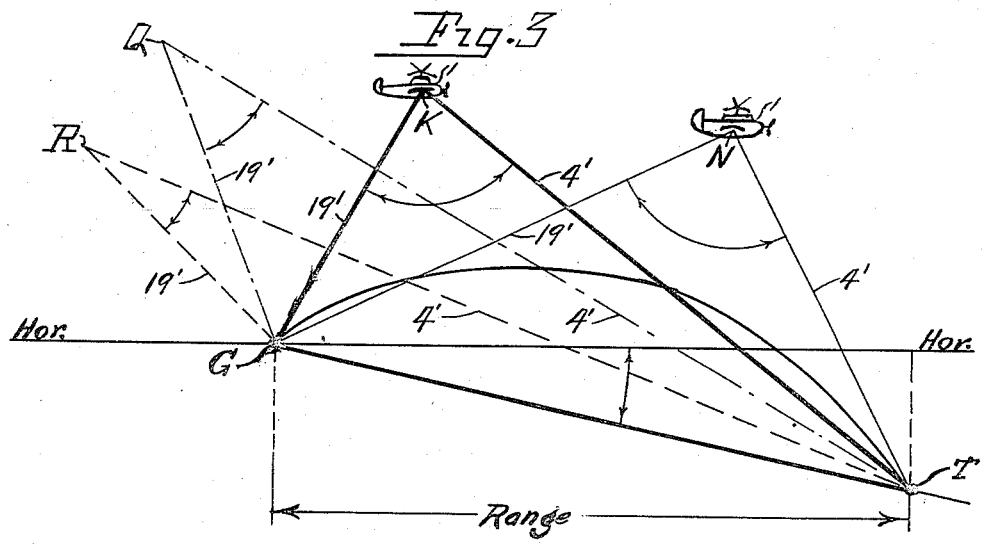
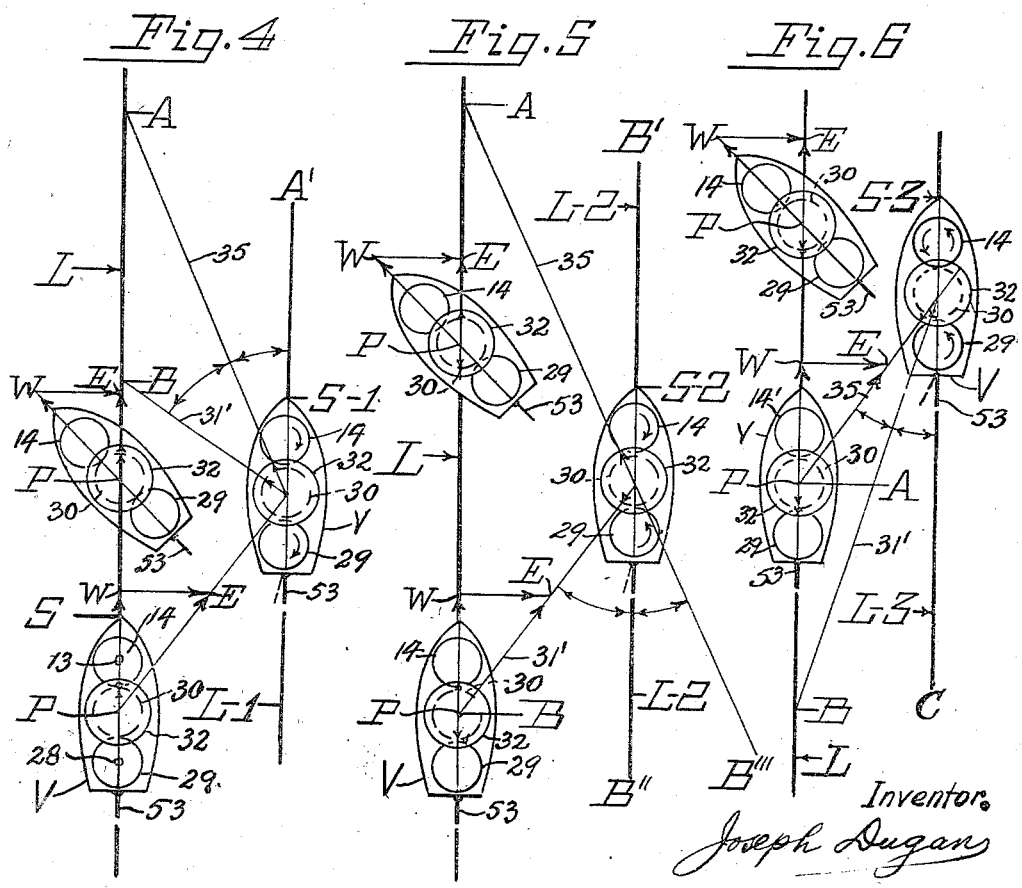

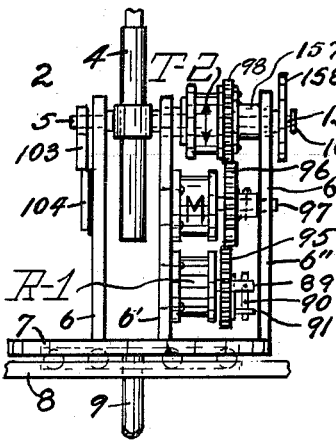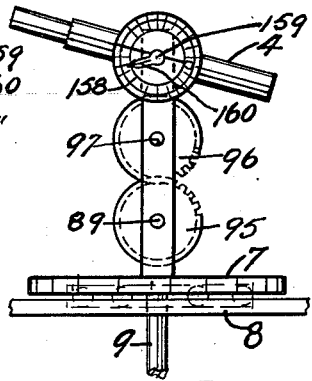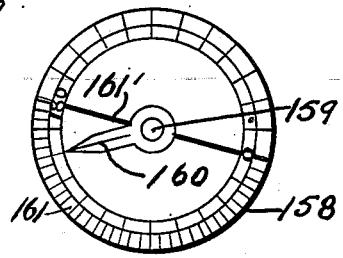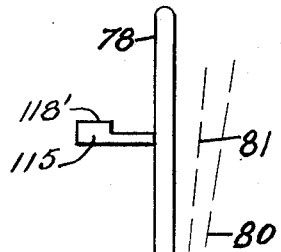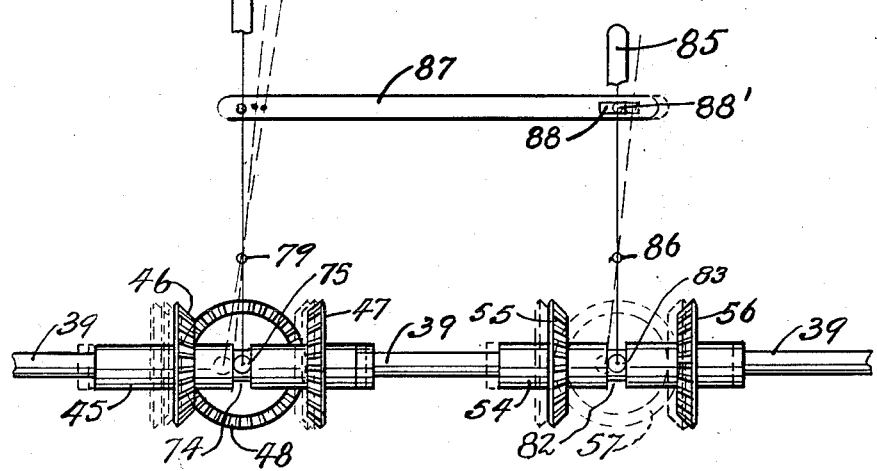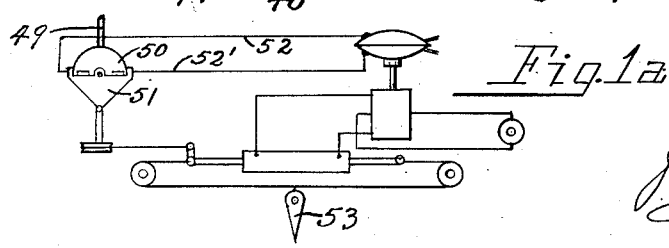

2,363,948

UNITED STATES PATENT OFFICE 2,363,948

GUNFIRE CONTROL SYSTEM

Joseph Dugan, Los Angeles, Calif., assignor of one-half to Evelyn R. Dugan, Los Angeles, Calif.

Application January 19, 1942, Serial No. 427,368

5 Claims. (Cl. 89—41)

This invention relates to a system of directing gunfire in accordance with data transmitted from aircraft, preferably of the auto-gyro or helicopter type, stabilized by a hydro-pneumatic gyropilot of the type disclosed in the U. S. patent to Sperry et. al. #1,992,970, March 5, 1935. The invention involves the use of the sight controlled steering system disclosed in my U. S. Patent #1,959,264, May 15, 1934, and of the rudder controlling system disclosed in my co-pending applications Radio controlled steering system, Serial No. 361,639, filed October 17, 1940; and Radio controlled navigational system, Serial No. 411,408, filed September 18, 1941, this application being a continuation-in-part of said copending applications.

The main object of the invention is to provide a system of gunfire control in which the azimuth of a target is continuously indicated to a gun by an aircraft flying along a straight course lying in a vertical plane passing through both gun and target; and, in which the angle formed by straight lines drawn from the craft to both gun and target is continuously transmitted by the craft to the gun. The system also involves use of range finders to determine the ranges continuously of the aircraft from both gun and target.

Other objects of the invention will become apparent as the detailed description thereof proceeds.

In the drawings:

Fig. 1 is a fragmentary diagrammatic layout, in elevation, of one sighting apparatus adapted for use on aircraft to carry this system of fire control into effect;

Fig. 1a is a diagram of the rudder control mechanism forming part of the system;

Fig. 2 is a fragmentary diagrammatic layout, in plan, of the system shown in Fig. 1, coupled with a system of transmitting indications from the craft to the gun by radio;

Figs. 3, 4, 5 and 6 are diagrams used to explain the operation of the apparatus shown in Figs. 1 and 2;

Fig. 7 is a side elevation of one of the sighting devices shown to the left of Fig. 1, with the telescope in a different position;

Fig. 8 is a rear elevation of the said sighting device;

Fig. 9 is an elevation, to an enlarged scale, of an indicator giving the angles between the lines of sight between the telescopes shown in Fig. 1;

Fig. 10 is a fragmentary diagram drawn to explain the method of shifting the rudder control for either automatic or manual control and in accordance with the zone of operation of the aircraft relative to the gun and target;

Fig. 11 is a diagram used to explain the operation of the system when rangefinders are substituted for either or both of the telescopes shown in Fig. 1;

Fig. 12 is a fragmentary end elevation of the rangefinder mechanism which may be substituted for the telescope structure shown at the left of Fig. 1;

Fig. 13 is a fragmentary end elevation of the rangefinder mechanism which may be substituted for the telescope structure shown at the right of Fig. 1;

Fig. 14 is a fragmentary end elevation of a rangefinder of conventional form which may be used in this system of fire control; and Fig. 15 is a fragmentary detail of gearing shown in Figs. 7 and 12, with wiring illustrated diagrammatically.

For proper understanding of the principles involved in the steering of a dirigible aircraft, under the control of two sighting devices, onto and in drift-corrected movement in a predetermined direction along a straight course lying in a vertical plane passing through any two spaced apart objects upon which said devices are separately held trained, it will be necessary to consider the space on opposite sides of said vertical plane as divided into three zones by vertical planes passing through said objects and perpendicular to said plane. One of these objects may be a gun; and the other, a target for the gun. In the intermediate zone, the craft moves between the two course-defining objects. In one of the outer zones, the craft moves toward both objects; and, in the other outer zone, the craft moves away from both objects.

With this division into zones understood, the principle involved, and as illustrated in Figs. 4, 5 and 6, requires: (1) that when the craft is in drift-corrected movement along the desired straight-line course, the rudder of the craft must be zero-centered (alined with the fore-and-aft axis); (2) that regardless of the heading of the craft, when it is located in either of the outer zones and is displaced to the right of said course (looking along the course in the desired direction of movement), the rudder must be continuously adjusted clockwise from zero-center through angles proportional to the difference between the exterior and interior-opposite angles at the base of the triangle formed by drawing straight lines to the laterally displaced craft from the two spaced apart course-defining objects; and (3) that, regardless of the headings of the craft, when it is located in the intermediate zone and is laterally displaced to the right of said course, the rudder must be continuously adjusted clockwise to angles proportional to the continuously varying sum of the interior angles at the base of the triangle formed by drawing straight lines to the laterally displaced craft from the two spaced apart course-defining objects.

The same principle is involved in the continuously varying adjustments of the rudder when the craft is located to the left of the desired course; except that in this event, the rudder must be adjusted counter-clockwise, instead of clockwise, from zero-center.

The system shown in Figs. 1 to 6 of the drawings is designed to steer a dirigible aircraft from any location onto and in drift corrected movement in a predetermined direction along a straight course lying in a vertical plane passing through two spaced apart objects within sighting range of two sighting devices mounted on said aircraft. Where one of these objects is a gun and the other is a target, it is obvious that the azimuth bearing of the target from the gun may be indicated continuously at the gun merely by holding a transit at the gun site continuously trained on the aircraft.

In this system, the control mechanism mounted on the aircraft 1 (see Figs. 1 and 3) comprises two sighting devices designated generally by the reference numerals 2 and 3. The device 2 includes a telescope 4 mounted by trunnions 5 and 5' to rotate about a normally horizontal axis in the standards 6 and 6', which are fixed to and extend vertically upward from a normally horizontal base plate 7. This base plate 7 is mounted to rotate about a vertical axis on a normally horizontal fixed part 8 of the craft 1, and has a shaft 9 extending through said part 8 to transmit the rotation of the sighting device 2 to the steering mechanism of the craft.

A grooved pulley 10 is fixed to the shaft 9 to transmit the rotation thereof through a crossed cable 11 to a similar pulley 12 fixed on a shaft 13. A gear 14 is fixed to the shaft 13 and meshes with a gear 15 fixed to a sleeve 16 which extends along and is mounted to rotate on a shaft 17 journaled at its lower end in a fixed bearing bracket 18.

The other sighting device 3 includes a telescope 19 mounted by trunnions 20 and 20' to rotate about a normally horizontal axis in the standards 21 and 21' which are fixed to and extend vertically upward from the normally horizontal base plate 22. This base plate 22 is mounted to rotate about a vertical axis on a normally horizontal fixed part 23 of the craft, and has a shaft 24 extending through said part 23 to transmit the rotation of the sighting device 3 to the steering mechanism of the craft.

A grooved pulley 25 is fixed to the shaft 24 to transmit the rotation thereof through a crossed cable 26 to a similar pulley 27 fixed on a shaft 28. A gear 29 fixed to the shaft 28 meshes with a gear 30 fixed to the shaft 17 which, as already indicated, is journaled at its lower end in the bearing bracket 18 and forms a pivot rod for the sleeve 16. A circuit-closing indicator arm 31 is secured to the upper end of the shaft 17 to rotate over a dial 32, fixed to the upper end of the sleeve 16, to make wiping contact with one or the other of the two contacts 33 and 34 mounted on the dial 32 at the opposite ends of an indicator line 35 extending diametrically across said dial. The relative arrangement of the parts so far described is such that the arm 31 can aline with the indicator line 35 and make contact with one or the other of the contacts 33 or 34 only when the lines of sight of the telescopes 4 and 19 lie substantially in the same vertical plane.

A bevel gear 36 is fixed to the lower end of the shaft 13 to mesh with the bevel gear 37 of a differential 38. The gear 37 is mounted to rotate on a shaft 39 and meshes with the gears 40 and 41 mounted to rotate on the opposite ends of the differential spider 42 which is pinned to the shaft 39. A bevel gear 43, fixed to the lower end of shaft 28, meshes with the bevel gear 44 which is also mounted to rotate on the shaft 39 and in mesh with the spider gears 40 and 41. A sleeve 45 is splined to the shaft 39 to slide thereon and rotate therewith. Bevel gears 46 and 47 are fixed to the sleeve 45 for movement, alternatively, into or out of mesh with a bevel gear 48 fixed to one end of a shaft 49.

The apparatus so far described is intended to be substituted for the directional gyro in the aforesaid Sperry gyropilot. The cut-off plate 50, which, in the gyropilot, would ordinarily be controlled by the directional gyro, is now fixed to the shaft 49 of this control apparatus. Cooperating with the cut-off plate 50 is the airport-carrying member 51 connected by the air tubes 52 and 52' to the air relay of the servo unit (see Fig. 1a) controlling the operation of the rudder 53.

A sleeve 54 is also splined to the shaft 39 to slide thereon and rotate therewith. Bevel gears 55 and 56 are fixed to the sleeve 54 for movement therewith, alternatively, into mesh with a bevel gear 57 fixed on the lower end of a shaft 58, which extends through a fixed instrument panel 59 and has a steering dial 60 fixed to its upper end. The dial 60 has a single line 61 extending diametrically across it to cooperate with lubber line 62 formed on a member 63 fixed to said panel. As will be later explained, the relative arrangement of the parts so far described is such that the line 61 can aline with the lubber line 62 only when the lines of sight of the telescopes 4 and 19 lie in the same vertical plane.

Where space is limited on the instrument panel 59, the dial 60 may be omitted, and a steering dial 64 may be used instead. This dial 64 is fixed to the upper end of a sleeve 65 journaled on the panel 59 to rotate on the sleeve 16. A bevel gear 66 fixed to the lower end of sleeve 65 meshes with a bevel gear 67 fixed to one end of a shaft 68 having at its other end a bevel gear 69 in mesh with a gear 70 pinned to the shaft 58. This dial 64 has an indicator line 71 extending diametrically thereon to cooperate with a lubber line 72 formed on a member 73 fixed to the panel 59.

The direction of movement of the clutch sleeve 45 to cause one or the other of the gears 46 or 47 to mesh with the gear 48 depends upon the location of the objects on which the telescopes are held trained relative to the craft as it proceeds in one direction or the other on the straight course lying in a vertical plane passing through said objects. The reasons for this dependence and the necessity for using the differential gearing, when steering is to be effected automatically, will appear from consideration of Figs. 4, 5 and 6. In these diagrams, the craft is indicated by the reference character V; the solid circle at the bow of the craft represents the gear 14; the solid circle at the center represents the dial 32 which is fixed to the upper end of the sleeve 16 carrying the gear 15 in mesh with gear 14; the smaller broken circle at the center represents the gear 30 which is fixed to the lower end of the shaft 17; and, the small solid circle at the stern represents the gear 29 in mesh with the gear 30. To facilitate description, these diagrammatic representations have been given the same reference characters as the parts they represent in the other figures.

Fig. 4 illustrates the craft V as starting from the point S in movement toward both of the spaced apart objects B and A along a straight course L lying in the vertical plane passing through both of said objects. As initially installed on the craft, the apparatus will be set up with the center line 31' of the indicator arm 31 in alinement with the line 35 on the dial 32, and lying in substantially the same vertical plane as the fore-and-aft axis of the craft which, for the moment, happens to lie in the vertical plane through said objects. Initially, too, the telescopes 4 and 19 must be set with their lines of sight horizontal and lying substantially in the same vertical plane.

The dial 32 is assumed as mounted to rotate in a horizontal plane through the same azimuth angles as the sighting device 2, so that the indicator line 35 may be considered as a horizontal line moving with and lying at all times in the vertical plane containing the line of sight of the telescope 4. In the same way, the center line 31' of the indicator arm 31 may be considered as a horizontal line moving with and lying always in the vertical plane containing the line of sight of the telescope 19. Obviously, the extensions of these horizontal indicator lines in Figs. 4, 5 and 6 may be considered as plan views of the two vertical planes of sight. Thus, the line 31' in Figs. 4, 5 and 6 represents the vertical plane of sight of the telescope 19 as well as the central line of the indicator arm 31; and, the line 35 represents the vertical plane of sight of the telescope 4 as well as the horizontal indicator line 35 on the dial 32.

Reverting now to Fig. 4, the craft V is shown at the starting point S headed along the course L under air speed PW and subjected to a cross wind WE which will cause the craft to drift from the course L at the ground speed PE, unless this initial heading be changed to correct for this drift. Assuming now that the craft has drifted, without change of heading, from the position S to the position S-1, and without change in the initial settings of the apparatus. In its new position S-1, the craft is headed along the line L-1 parallel to the course L and is laterally displaced to the right of course L; consequently, the rudder 53 must be moved to the left (clockwise) in order to steer the craft toward the course L.

If, in this new position S-1 of the craft, the telescope 4 is trained on the object A, the sighting device 2 and its vertical shaft 9 will be rotated counter-clockwise through the angle A'PA. This counter-clockwise rotation of the shaft 9 is transmitted by grooved pulley 10, crossed cable 11 and pulley 12 to effect clockwise rotation of the shaft 13 and the gears 14 and 36 secured thereto through the same angle A'PA. Clockwise rotation of gear 14 causes counter-clockwise rotation of the gear 15, sleeve 16 and the dial 32 through the angle A'PA. This means that the dial 32, with its indicator line 35, and the sighting device 2 have both rotated counter-clockwise through the angle A'PA. At the same time, clockwise rotation of the bevel gear 36 through the angle A'PA caused a counter-clockwise rotation of the differential gear 37, looking from the right of gear 37 along the shaft 39 in Fig. 1.

If the telescope 19 is also trained on the object B, the sighting device 3 and its vertical shaft 24 will be rotated, from their initial settings, counter-clockwise through the angle A'PB. This counter-clockwise rotation of the shaft 24 is transmitted by the grooved pulley 25, crossed cable 26 and pulley 27 to effect clockwise rotation of the shaft 28 and gears 29 and 43 secured thereto through the angle A'PB. Clockwise rotation of the gear 29 causes counterclockwise rotation of the gear 30, shaft 17 and its indicator arm 31 through the angle A'PB. This means that the indicator arm 31 and the sighting device 3 have both rotated clockwise through the angle A'PB. At the same time, the clockwise rotation of the bevel gear 43 through the angle A'PB causes a clockwise rotation of the differential gear 44, looking from the right of gear 44 along the shaft 39.

Since the differential gear 44 rotates clockwise through the larger angle A'PB, and the other differential gear 37 rotates counter-clockwise through the smaller angle A'PA, it is obvious that the differential spider 42 and the shaft 39 must rotate clockwise through the angle A'PB minus the angle A'PA; that is, clockwise through the angle APB. From inspection of Fig. 1 it is evident that clockwise rotation of the gear 46 would cause counter-clockwise rotation of the rudder control shaft 49 and rudder 53. Since the rudder must be rotated clockwise to steer the craft V from the position S-1 toward the course L, it will be necessary to shift the sleeve 45 to cause engagement of the gear 47 with gear 48.

It is obvious that drift of the craft V to the left of the course L, instead of to the right, will call for opposite rotations of the gears 14 and 29. Therefore, the gears 47 and 48 must remain in mesh while the craft is in movement in the general direction of the objects B and A on either side of the course L.

In order to steer the craft from the position S-1 onto the course L and in drift-corrected movement along that line in the direction BA, the rudder 53 must be rotated clockwise through an angle proportional to the angle APB. Then, as the craft approaches the course L, the angle APB becomes smaller and smaller and the rudder angle decreases proportionally; until, finally, the angle APB vanishes, the lines AP and BP coincide; and the craft "crabs" along the course L, headed into the wind WE at the drift angle WPE under air-speed PW and ground speed PE, with the rudder 53 alined with the fore-and-aft axis of the craft. The correction is thus completely automatic, and the craft track eventually approaches the desired course L through the objects B and A asymptotically.

In Fig. 5, the craft V is shown as starting from the object B toward the object A under a cross wind WE and at air speed PW, headed along the course L. If this heading be maintained, the craft will arrive eventually at the position S-2 with its fore-and-aft axis lying in the line L-2 parallel to the course L. With the craft in position S-2, it is evident that the gear 14 must have rotated clockwise through the angle B'PA to cause counter-clockwise rotation of the dial 32 and its indicator line 35 through the same angle B'PA. It is also evident that the gear 29 must have rotated counter-clockwise through the angle B''PB to cause clockwise rotation of the indicator arm 31 through the same angle B''PB. This means that the dial 32 and indicator 31 rotate in opposite directions when the craft is laterally displaced from the course L during its flight between the objects B and A.

Clockwise rotation of the gear 14 and its associated bevel gear 36 causes counter-clockwise rotation of the differential gear 37; while counter-clockwise rotation of the gear 29 and its associated gear 43 causes counter-clockwise rotation of the differential gear 44. This means that the angles B'PA and B"PB are added in the differential to rotate the shaft 39 counterclockwise through the sum of the interior angles at the base BA of the horizontal triangle formed by drawing straight lines from the vertical lines projected upwardly from the objects B and A. Counter-clockwise rotation of the shaft 39 and gear 46 produces the required clockwise rotation of the rudder control shaft 49.

To steer the craft from the position S–2 onto the course L and in drift-corrected movement along that course in the direction BA, the rudder 53 must be rotated clockwise through an angle proportional to the sum of the angles B'PA and B"PB, or the angle B'"PB. Then, as the craft approaches the course L, the angle B'"PB becomes smaller and smaller and the rudder angle decreases proportionally; until, finally, the angle B'"PB vanishes, the lines AP and BP coincide; and, the craft "crabs" along the course L, headed into the wind WE at the angle of drift WPE under airspeed PW and ground speed PE, with the rudder 53 again alined with the fore-and-aft axis of the craft.

In Fig. 6, the craft is shown as headed, under the same conditions of air-speed and cross wind, for movement along the course L away from both objects A and B. If this heading be maintained, the craft will arrive eventually at the position S–3 headed along the line L–3 parallel to the course L. With the craft in position S–3, it is evident that the gear 14 must have rotated counter-clockwise through the angle CPA to cause clockwise rotation of the dial 32 and its indicator line 35 through the same angle CPA. It is also evident that the gear 29 must have rotated counter-clockwise through the angle CPB to cause clockwise rotation of the indicator arm 31 through the same angle CPB. Counter-clockwise rotation of gear 14 and its associated bevel gear 36 causes clockwise rotation of the differential gear 37, viewed from the right; while counter-clockwise rotation of gear 29 and its associated bevel gear 43 causes counter-clockwise rotation of the differential gear 44 through the angle CPB.

Since the differential gear 37 rotates clockwise through the larger angle CPA; while the other differential gear 44 rotates counter-clockwise through the smaller angle CPB, it is obvious that the shaft 39 and gear 46 must rotate clockwise through the angle CPA minus the angle CPB; that is, clockwise through the angle APB, which is evidently equal to the difference between the exterior and interior-opposite angles at the base of the horizontal triangle APB. In this case, to effect the necessary clockwise rotation of the rudder shaft 49, the sleeve 45 must be shifted to mesh gear 47 with gear 48.

It will be apparent from inspection of Figs. 4, 5 and 6, that the angles formed by the horizontal straight lines drawn to the craft from the verticals projected from the objects A and B, are independent of the headings of the craft. This means that, regardless of the headings of the craft in any of its laterally displaced positions, the sight-controlled differential gearing will steer the craft from any such position (within sighting range) onto and in drift-corrected movement in a predetermined direction along the course L. For example, if the craft in position S–1 were headed in the direction opposite to that shown in Fig. 4, the adjustment of the rudder 53 would still be clockwise and proportional to the angle APB, and would first cause the craft to swing counter-clockwise and somewhat spirally away from the course L through an angle of 180 degrees; and, thence on a path eventually tending asymptotically toward the course L into drift-corrected movement in the direction BA.

The direction of movement of the craft along the course L, is determined by the objects upon which the telescopes 4 and 19 are trained. If the telescopes 4 and 19 are trained on the objects A and B, respectively, the craft will move in the direction BA. If the telescopes 4 and 9 are trained on the objects B and A, respectively, the craft will move in the direction AB. The rule is that the direction of movement of the craft along the course L is that direction in which the object on which the telescope 4 is trained lies ahead of the object on which the telescope 19 is trained. In other words, the telescope 4 controls the direction of flight of the craft when the steering is to be effected automatically.

It is obvious that steering of the craft may be effected manually by moving the sleeve 45 to an intermediate position in which the gear 48 is clear of both gears 46 and 47. When this is done a third operator or pilot is required to steer the craft so as to effect coincidence of the central line 31' on the indicator arm 31 with the indicator line 35 on the dial 32.

To facilitate shifting of the sleeve 45, the latter is provided with a circumferential groove 74 to receive the pins 75 extending radially into said groove from the arms 76 and 77 of a shipping lever 78 mounted to swing about a fixed pivot 79. As shown in Figs. 2 and 10, the lever 78 is positioned to mesh gear 46 with gear 48 for automatic steering in the zone between the two objects sighted. A throw of the lever 78 to the position indicated by the broken line 80 (Fig. 10) causes the gear to mesh with gear 48 to provide for automatic steering in either of the outer zones. In the middle position indicated by the broken line 81, the gear 48 is free from both gears 46 and 47, to provide for manual steering of the craft.

The dial 60 with its single indicator line 61 movable across the fixed lubber line 62 simplifies the manual steering somewhat, since it is obviously easier to steer the craft to make a single indicator line up with a fixed mark than it is to bring two rotatable indicators into alinement. To ensure continuous operation of the dial 60 in the different zones, whether the steering be effected manually or automatically, the sleeve 54 is provided with a circumferential groove 82 to receive pins 83 extending inwardly from the arms of a yoke 84 at the end of a shipping lever 85 mounted to swing about a fixed pivot 86.

The pivots 79 and 86 (see Fig. 10) are equidistantly spaced from the axis of shaft 39. A link 87 is pivoted at one end to the lever 78, and is provided with a lost-motion slot 88 to receive a stud 88' projecting from the lever 85. This arrangement leaves the bevel gear 55 always in mesh with the gear 57 when gears 46 and 48 are in mesh; and, leaves gear 56 always in mesh with gear 57 when gears 47 and 48 are in mesh.

From inspection of Figs. 1 and 2, it is obvious that the dial 60 must rotate in the opposite direction to the rudder so that the pilot may steer the craft to make the lubber line 62 follow the dial indicator line 61. As shown in Figs. 1, 2 and 10, the dial 60 is connected for operation in the intermediate zone (between objects A and B), with the steering automatic under the control of the sights. If the lever 78 is now thrown to its middle position 81, the rudder shaft gear 48 on the rudder control shaft 49 will be freed from both gears 46 and 47, but the lost-motion between the link 87 and lever 85 leaves the lever 85 undisturbed and with the gears 55 and 57 still in mesh to provide for steering indication in the intermediate zone. A further throw of the lever 78 to position 80 throws the gear 47 into mesh with gear 48 for automatic steering in either of the outer zones and also throws the lever 85 to bring gear 56 into mesh with gear 57 for proper indication in either of said outer zones.

As already indicated the apparatus herein described is intended for use on the aircraft 1, shown in Fig. 3, in which the various lines are assumed as lying in the vertical plane passing through a gun located at the point G and a target located at the point T. These points will be referred to hereafter as the "gun" and "target", respectively.

In Fig. 3, the craft 1 is shown as located at the point K and as flying in the zone between the gun G and target T. The telescope 4 is assumed to be trained on the target T, and therefore controls the automatic steering mechanism to cause drift-corrected flight of the craft on a straight course in the vertical plane passing through both gun and target, the other telescope 19 being held trained on the gun G. The azimuth of the target relative to the gun may be determined merely by training the gun until its bore axis lies in the same vertical plane as the craft, or by holding the sight of a transit trained on the craft. The angle of elevation of the craft and its range from the gun may be determined by any of the rangefinders in common use; while the vertical angle GKT between the lines of sight 4' and 19' of the telescopes 4 and 19, respectively, is measured by the apparatus installed on the craft and is transmitted by radio continuously from the craft to the gun.

To measure the vertical angle GKT, a transmitter T-1 is fixed to the standard 21' of the sighting device 3, with its rotor secured to the trunnion 20' of the telescope 19. The rotation of the rotor of the transmitter T-1 is transmitted through wires w and w' to the repeater R-1 which is fixed to the standard 6' of the sighting device 2. The rotor shaft 89 of the repeater R-1, rotating in synchronism with the rotor shaft of transmitter T-1, moves the conductor arm 90 with its trolley roller 91 onto one or the other of the conducting segments 92 and 93 separated by the usual central insulating strip 94. (See Fig. 15.) These plates 92 and 93 are arranged on and insulated from a gear 95 which is mounted to rotate around the shaft 89 and meshes with a similar gear 96 fixed to the shaft 97 of the servo-motor M operable in one direction or the other by the movements of the arm 90 over the plates 92 and 93.

The servo motor is also fixed to the standard 6', and its gear 96 meshes with a similar gear 98 fixed to the stator casing of the transmitter T-2 which is mounted to rotate bodily in the standards 6' and 6''. The rotor shaft of the transmitter is fixed to the trunnion 5' of the telescope 4. From inspection of Figs. 1 and 7, it is evident that the stator of the transmitter T-2 rotates through the same angle from the horizontal as the rotor of the transmitter T-1; and, at the same time, the rotor of transmitter T-2 is rotated by the trunnion 5 through the same angle as the telescope 4 is rotated from the horizontal. It is obvious, then, that the angle transmitted by the transmitter T-2 is the angle between the lines of sight 4' and 19' of the telescopes 4 and 19, respectively. Under the conditions indicated in Fig. 3, the angle to be transmitted by the transmitter T-2 from the aircraft to the gun would be the angle GKT. The system of transmission from the transmitter T-1 through the repeater R-1 and follow-up motor M to the transmitter T-2 may be of the common direct current Selsyn type such as is disclosed in my U. S. Patent 1,800,931 April 14, 1931, or in the U. S. patent to Ford et al. 1,937,336 November 28, 1933.

A suitable two-line system for transmitting these angles by radio to a repeater R-2 at the gun is disclosed in the U. S. patent to Moseley et al. #2,256,487, September 23, 1941. While the angle GKT is generated continuously in the transmitter T-2, this apparatus is provided with means to prevent its transmission unless and until the craft 1 is actually located in the vertical plane passing through the gun and target. In Fig. 2 one of the conductor wires 99 is shown as connecting the transmitter T-2 directly to the amplifier of the radio transmitter RT. The other wire 100 is connected to the conducting indicator arm 31, which, as already indicated, constitutes a switch controlled by the sighting device 3 and is mounted to make contact with the contacts 33 and 34 at the opposite ends of the line 35 on the insulated dial 32. These contacts 33 and 34 are connected to each other by a wire 101 having a terminal contact a adapted to make contact with a contact c projecting laterally from the piston rod r of the servo motor s controlled by the gyro-horizon of the gyro-pilot. A second contact d also projects from the rod r at a distance from the contact c equal to the stroke of the rod r and is adapted to make contact with the contact e at the end of a wire 101' connected to the amplifier of the radio transmitter RT. These contacts ac and de close the circuit through the wires 101 and 101' only when the servo piston is in neutral position; that is, only when the craft is horizontal longitudinally and laterally. Any operation of the repeater R-2 at the gun is, therefore, a definite indication that the craft is located in the vertical plane passing through both gun and target, that its bearing relative to the gun is also the bearing of the target; and, that the angle indicated on the repeater R-2 is the angle between the lines of sight to the gun and target in that vertical plane.

Where telescopes are used, it is obviously necessary to have the vertical angle between the two lines of sight taken in at least two different positions in the vertical plane passing through both gun and target. At the point K (Fig. 3), the line of sight KT merely indicates the direction of the target from the craft. If, now, the craft be moved in the vertical plane to the point N, the line of sight NT would intersect the line KT at the target T. When the range and angle of elevation of the craft in its new position N is determined at the gun, and the angle GNT is transmitted from the craft to the repeater R-2 at the gun, the gunners have all the data necessary for rapid determination of the range of the target as well as its bearing and angle of site. At the gun, a switch 102 may be used to freeze the readings of the repeater R-2 at any instant when the angle of elevation and range of the craft from the gun have been determined; say, for example, when the craft is at the point K. The switch may then be closed during the time of travel of the craft from the point K to the next point N of elevation and range measurement, when the indications of the repeater R–2 may be frozen again. In this manner, the gunners may be assured of having a proper indication of the angle between the two lines of sight at the instant when the position of the craft in space is determined and measured.

The craft is shown in Fig. 3 as operating in the intermediate zone (between the gun and target), and as flying toward the target. However, the craft may be steered automatically, under control of the sights, to fly in either direction and in either of the outer zones. The broken lines RG, RT and QG, QT show the lines of sight as taken from the points R and Q in one of the outer zones. The gears 46 and 55 are properly shown in Fig. 1 as meshing with the gears 48 and 57, respectively, for operation in the intermediate zone. While these gears may be shifted manually for operation in either of the outer zones, this system includes means for automatically performing this gear-shifting function as the craft passes vertically from one zone to another.

The clutch shifting mechanism comprises a switch 103 fixed to the trunnion 5 of the telescope 4 in line with the optical axis of the telescope and adapted to make wiping contact with a contact plate 104 fixed to and insulated from the standard 6. A similar switch 105 is fixed to the trunnion 20 of the telescope 19 in line with the optical axis thereof and adapted to make wiping contact with the end of the contact plate 106 fixed to and insulated from the standard 21. These plates 104 and 106 are connected to each other by a wire 107, and by a wire 108 to (Fig. 2) the positive terminal of the battery b. The negative terminal of the battery is connected by a wire 109 to a spring contact 110 fixed to but insulated from the shipping lever 78. When the telescope 4 and its switch 103 swing through the vertical, as shown in Fig. 7, contact of the switch 103 with the end of the plate 104 closes the circuit through battery b, wires 108 and 107, plate 104, switch 103, wire 110', latch-releasing magnet 111, wire 112, spring contact 110 and return wire 109.

The latch-releasing magnet 111 is adapted, when energized, to swing a latch 113 about its pivot 114 out of locking engagement with the keeper 115 fixed to the shipping lever 78. When so released, the lever is swung by a tension spring 116 about its pivot 79 against a stop 117, thereby moving the sleeves 45 and 54 to cause the gears 47 and 56 to mesh with the gears 48 and 57, respectively. This throw of the lever 78 against the stop 117 breaks the contact between the spring contact 110 and the terminal 118 at the end of the line 112. The hook end of the latch 113 then rests upon the raised part 118' of the keeper 115 and forces a spring contact 119, fixed to but insulated from the latch 113, against the terminal 120 of a wire 121 tapped to the return wire 109.

It is evident that this clutch shifting operation is effected only by that telescope which happens to be trained on the object over which the craft passes in a vertical plane. It is also apparent that the clutch must be released when the craft passes from the intermediate zone into either of the outer zones. For example, as the craft passes from the inner zone over the target T, the telescope 4 alone operates the clutch releasing mechanism, since the circuit cannot be closed by the telescope 19 which remains inclined to the vertical.

Let it be assumed, now, that the craft is located at the point Q in the outer zone to the left of the gun G and is moving to pass into the inner zone, with the telescope 4 trained on the target T and the telescope 19 trained on the gun. As the craft moves in the general direction of the target T, it is obvious that the switch 103 cannot make contact with plate 104; but, as the craft passes vertically over the gun G, the telescope 19 becomes vertical and switch 105 makes contact with plate 106. The circuit then through the battery is completed (with latch 113 raised) by wires 108, 107, plate 106, switch 105, wire 122, latch-locking magnet 123, wire 124, spring contact 119, wire 121 and return wire 109.

Where it is possible to use range finders on the craft, these may be substituted for the telescopes 4 and 19. The ranges of the craft from the gun and target could thus be determined on the craft and transmitted to the gun along with the values of the angle between the lines of sight from the craft to the gun and target. The arrows applied to the "Range" lines in Fig. 11 suggest a preference for determining at the gun the angle of elevation of the craft and the range from gun to craft, leaving to the craft the matter of continuously transmitting to the gun the angles between the lines of sight and the range from craft to target only. This would eliminate the possibility of an enemy at the target intercepting signals from the craft sufficiently complete to enable it to determine the range and bearing of the gun from the target.

The range finders may be of any conventional form. The finder shown in Fig. 14 comprises a main tubular body 125 provided with an eyepiece 126 and sighting extensions 127 and 128. The knob 129, ordinarily used to set the instrument for different ranges, may be used to turn a gear 130 instead of the usual range-indicating dial; and, this gear 130 meshes with a gear 131 fixed to the rotor shaft of a transmitter T–3 wired to transmit range indications to the radio transmitter RT for re-transmission to a range repeater at the gun. A dial 132, cooperating with a pointer 133, may be mounted on the gear 130 to indicate ranges on the craft.

Fig. 12 shows one of these rangefinders mounted to rotate about a horizontal axis in the upper ends of standards 134, 135, 136 and 137 fixed to and extending vertically upward from the horizontal base plate 7, in place of the standards 6, 6' and 6" shown in Figs. 1, 2 and 7. The repeater R–1 and servo motor M are fixed to the standard 135, and the stator of the transmitter T–2 is mounted to rotate bodily between the standards 134 and 135. The gearing for rotating this stator in synchronism with the rotor of transmitter T–1 (Fig. 13) is the same as the gearing shown in Fig. 7, the corresponding elements being designated by the same reference numerals. The transmitter T–3 is, obviously, intended to transmit the range of the craft 1 from the gun G to the radio transmitter RT for retransmission to a range repeater at the gun.

The rotation of the range finder 125 about its horizontal axis is transmitted to the rotor of the transmitter T-2 by means of the gear 138 meshing with the idler gear 139 which is mounted to rotate between the standards 134 and 135 on a shaft 140 and meshes with a gear 141 fixed to the transmitter rotor shaft 142. The rotor shaft 142 extends through the standard 134 to receive a switch 143 cooperating with the contact plate 144 fixed on the standard to perform the same function as switch 103 and plate 104 in Fig. 1. This rangefinder structure mounted on the base plate 7 is considered as a sighting device and is designated as a whole by the reference numeral 2'.

The sighting device 3' shown in Fig. 13 corresponds to the sighting device 3 shown in Fig. 1, and comprises a rangefinder 125', similar to finder 125, mounted to rotate about a horizontal axis in the upper ends of the standards 145, 146, 147 and 148 fixed to and extending upwardly from the horizontal base plate 22. The rotation of the finder 125' about its horizontal axis is transmitted to the rotor shaft 149 of the transmitter T-1 by means of a gear 150 fixed to the main body part of the finder 125' through an idler gear 151 mounted to rotate between the standards 146 and 147 on a shaft 152 and in mesh with a gear 153 fixed to the rotor shaft of the transmitter T-1. The rotor shaft 154 extends through the standard 146 to receive a switch 155 cooperating with a contact plate 156 fixed to the standard 146 to perform the same clutch control function as the switch 105 and contact plate 106 in Fig. 1. The transmitter T-4 of Fig. 13 is similar to the transmitter T-3 of Fig. 12, but is intended to transmit the range between the craft 1 and target T to the radio transmitter RT for retransmission to a range repeater at the gun.

The steering and indicating mechanism controlled by the sighting devices 2' and 3' is the same as that controlled by the sighting devices 2 and 3, and is fully shown in Figs. 1 to 10 of the drawings. The transmitter T—1 of the sighting device 3' is connected, as before, to the repeater R—1 of the sighting device 2' to control the rotation of the stator of the transmitter T—2 through the servo-motor M.

It may be found necessary to transmit the data from the craft by radio telephone instead of automatically. Where range finders are used, the ranges may be determined from the indications on the dials 132. To indicate, on the craft, the angles between the lines of sight, the sleeve 157 fixed to the stator of transmitter T—2 is extended through the standard 6" and has a dial 158 fixed thereto. The transmitter rotor shaft 159 extends through the sleeve 157 and dial 158 and has an indicator 160 suitably secured to the end thereof to travel over the scale 161 formed on said dial. A line 161' on the scale extends as a diameter across the dial and cooperates with the indicator 160 as a means for alining the telescopes or rangefinders in the initial set up of the apparatus on the aircraft.

As a whole, this apparatus forms an attachment for the Sperry gyropilot which may be used, alternatively, with the directional gyro of the gyropilot to steer the craft automatically in drift-corrected movement in a predetermined direction along a straight course lying in a vertical plane passing through any two spaced apart objects upon which the sights of the attachment are held trained. The attachment requires no change whatever in the gyropilot. When the attachment is in use, the directional gyro is cut out of operation; and, either may be thrown into or out of operation by the use of any suitable clutch mechanism.

What I claim is:

1. In a system of gunfire control; a horizontally stabilized aircraft, means on said aircraft for continuously sighting two spaced apart objects, and mechanism controlled by holding said sighting means separately trained on said objects for steering said aircraft along a straight course over and lying in the vertical plane passing through said objects.

2. In a system of gunfire control: a horizontally stabilized aircraft, means on said aircraft for continuously sighting on a gun and target, mechanism controlled by holding said sighting means separately trained on the gun and its target for steering said aircraft along a straight course over and lying in the vertical plane passing through the gun and target, and means on said craft for indicating the angle between the lines of sight in said vertical plane from said sighting means to said gun and target.

3. In a system of gunfire control: a horizontally stabilized aircraft, means on said aircraft for continuously sighting on a gun and target, mechanism controlled by holding said sighting means separately trained on the gun and its target for steering said craft along a straight course over and lying in the vertical plane passing through the gun and target, means on said craft for indicating the angle between the lines of sight in said vertical plane from said sighting means to said gun and target, and means for transmitting from the craft to the gun the values of said angle only when the craft is located on said course.

4. In a system of gunfire control: a horizontally stabilized aircraft; two sighting devices, each mounted to rotate about a normally horizontal and a normally vertical axis on said craft; two indicators rotatable about a common axis on said craft; means for transmitting the rotation of one of said devices about its normally vertical axis to one of said indicators; means for transmitting the rotation of the other device about its normally vertical axis to the other indicator; said indicators being mounted to aline with each other only when the lines of sight of said devices lie in the same vertical plane; and means for indicating the angle between said lines of sight only when both lines lie substantially in the same vertical plane.

5. In a system of gunfire control; the apparatus set forth in claim 4 in combination with mechanism connected to said sighting devices and operated by the rotations thereof about their vertical axes for steering said aircraft along a straight course lying in the vertical plane passing through any gun and target upon which said devices may be separately and continuously held trained.

JOSEPH DUGAN.